US008180287B2

(12) United States Patent
Takeda

(10) Patent No.: US 8,180,287 B2
(45) Date of Patent: May 15, 2012

(54) PORTABLE TERMINAL

(75) Inventor: Kentaro Takeda, Tokyo (JP)

(73) Assignee: Fujitsu Toshiba Communications Limited, Kawasaki (JP)

( * ) Notice: Subject to any disclaimer, the term of this patent is extended or adjusted under 35 U.S.C. 154(b) by 325 days.

(21) Appl. No.: 12/558,791

(22) Filed: Sep. 14, 2009

(65) Prior Publication Data

US 2010/0081383 A1 Apr. 1, 2010

(30) Foreign Application Priority Data

Sep. 26, 2008 (JP) ............................... P2008-248958

(51) Int. Cl.
H04B 5/00 (2006.01)
H04B 7/00 (2006.01)

(52) U.S. Cl. ................... 455/41.1; 455/41.2; 455/41.3; 455/566; 455/557

(58) Field of Classification Search .............. 455/41.1, 455/41.2, 41.3, 566, 557
See application file for complete search history.

(56) References Cited

U.S. PATENT DOCUMENTS

| 7,899,397 | B2 * | 3/2011 | Kumar | 455/41.2 |
|---|---|---|---|---|
| 7,941,131 | B2 * | 5/2011 | Malik | 455/418 |
| 2005/0047426 | A1 | 3/2005 | Aaltonen et al. | |
| 2007/0093275 | A1 | 4/2007 | Bloebaum et al. | |
| 2007/0099679 | A1 | 5/2007 | Saarisalo | |
| 2008/0004082 | A1* | 1/2008 | Bloebaum | 455/566 |
| 2008/0043685 | A1* | 2/2008 | Sandblom | 370/338 |
| 2008/0194202 | A1* | 8/2008 | Song | 455/41.2 |
| 2009/0156251 | A1* | 6/2009 | Cannistraro et al. | 455/557 |
| 2009/0279872 | A1* | 11/2009 | Umemoto et al. | 386/124 |
| 2009/0304217 | A1* | 12/2009 | Thalheimer et al. | 381/334 |
| 2010/0323682 | A1* | 12/2010 | Hatayama et al. | 455/422.1 |

FOREIGN PATENT DOCUMENTS

| CN | 101263694 | | 9/2008 |
|---|---|---|---|
| EP | 1 494 375 | A2 | 1/2005 |
| JP | 2005-045557 | A | 2/2005 |
| WO | WO 00/78050 | A1 | 12/2000 |
| WO | WO 2005/052764 | A2 | 6/2005 |
| WO | WO 2007/050138 | A1 | 5/2007 |

OTHER PUBLICATIONS

Chinese Office Action dated Feb. 1, 2011 as received in related application No. CN 200910176700.5.
European Search Report dated Feb. 3, 2010 issued in counterpart European Application No. 09170278.7.

* cited by examiner

Primary Examiner — Wen Huang
(74) Attorney, Agent, or Firm — Maschoff Gilmore & Israelsen

(57) ABSTRACT

A portable terminal includes: a display unit configured to display various information; an user interface; a proximity communication interface configured to establish a wireless communication path with a counterpart device in a proximity state; a detector configured to detect whether the portable terminal is in an enabled state capable of performing a content movement operation with the user interface or in a disabled state that is not capable of performing the content movement operation with the user interface; and a content controller configured to perform a process for controlling the display unit to display a list of contents which can be transmitted by the proximity communication, when the proximity communication interface establishes the wireless communication path and the detector detects that the portable terminal is in the enabled state.

8 Claims, 6 Drawing Sheets

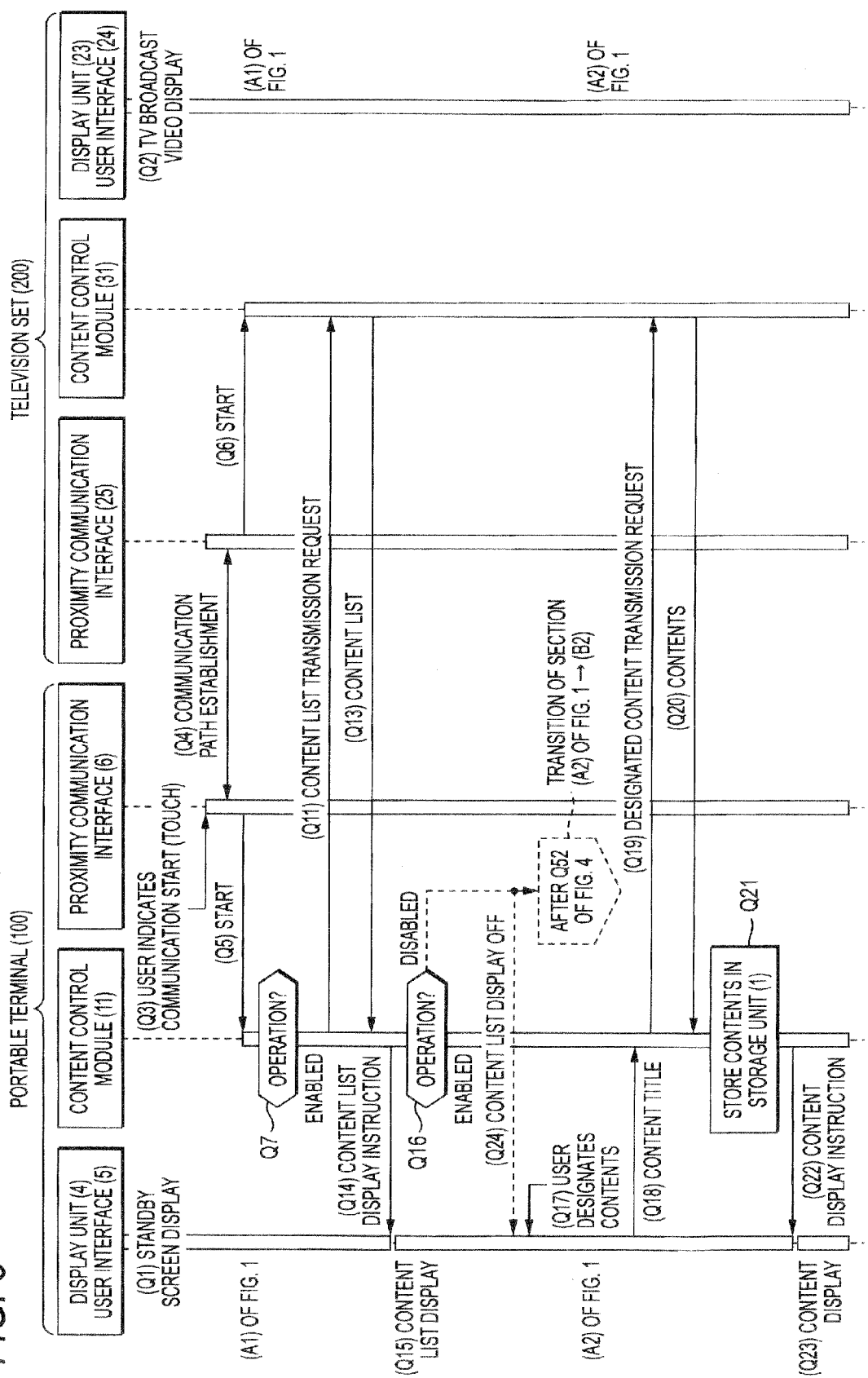

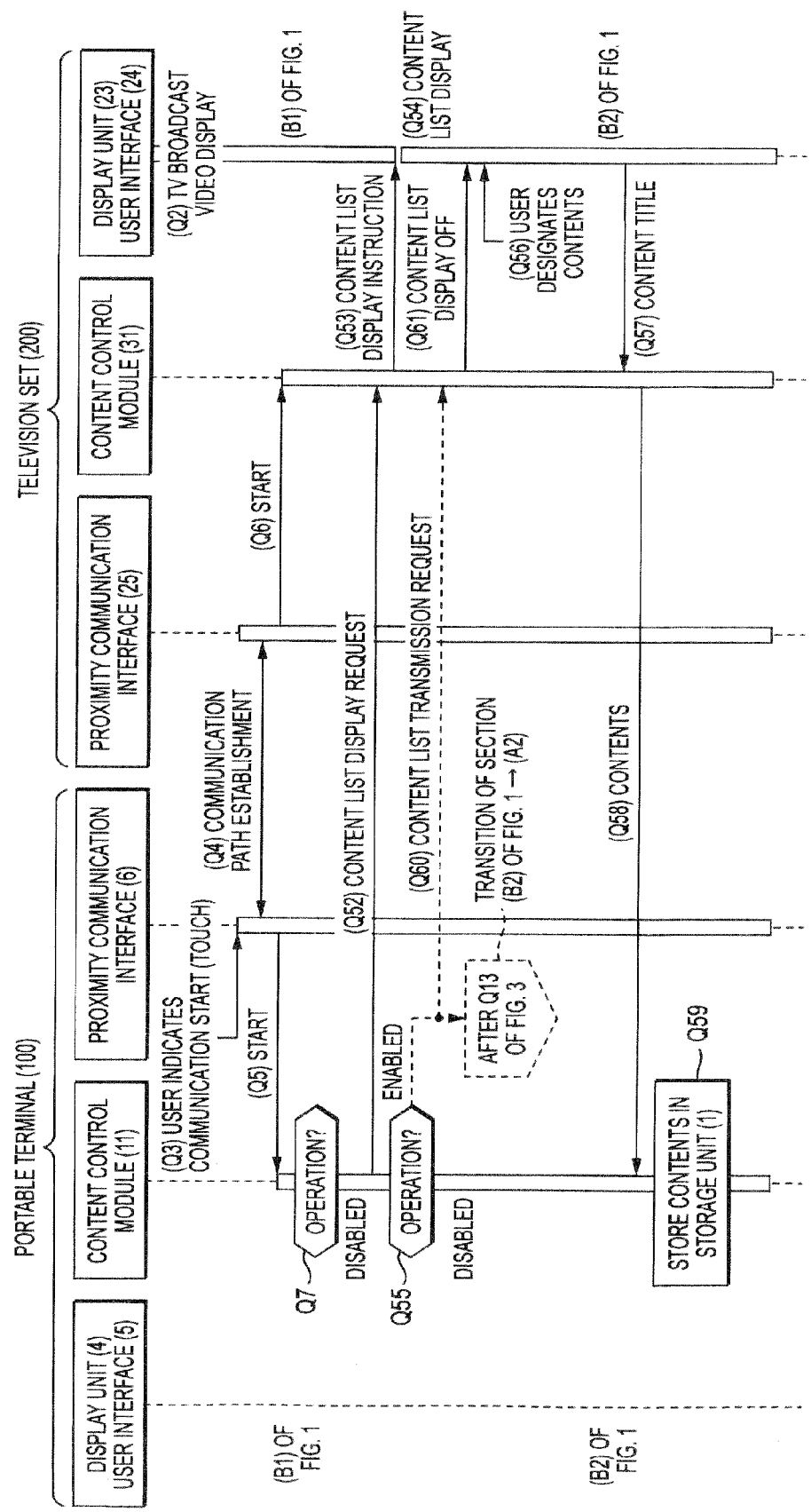

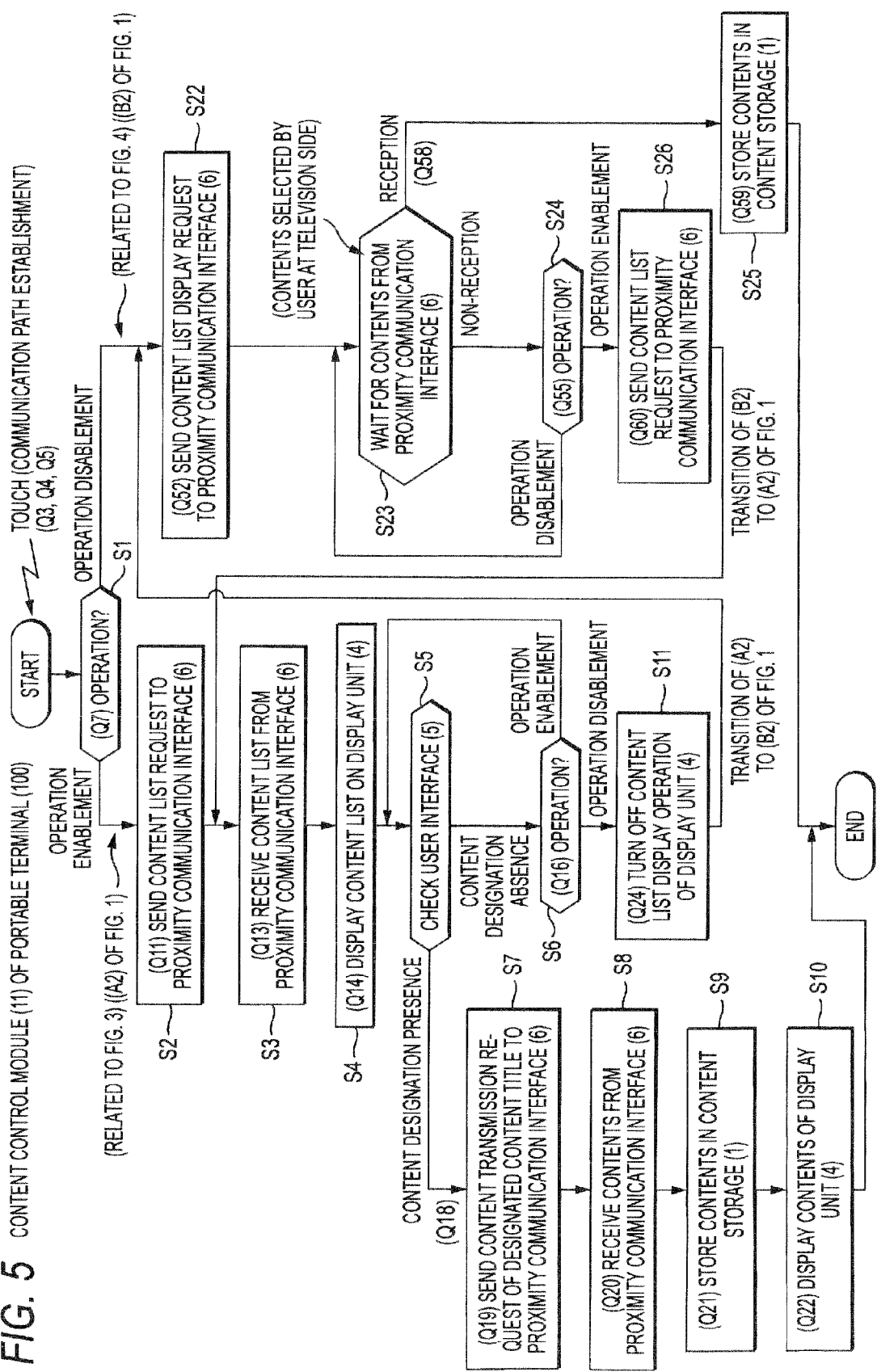
FIG. 5 CONTENT CONTROL MODULE (11) OF PORTABLE TERMINAL (100)

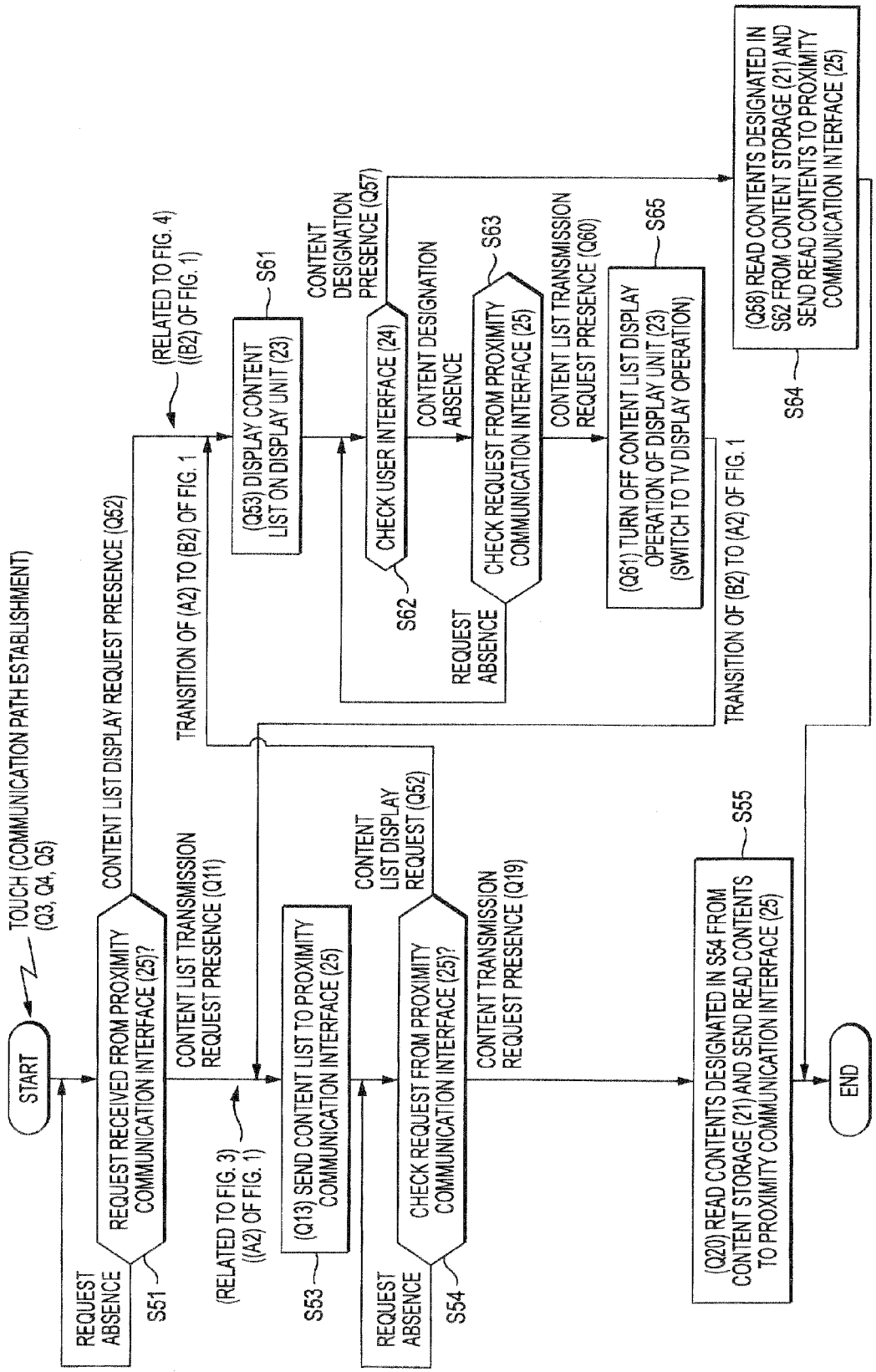
FIG. 6 CONTENT CONTROL MODULE (31) OF TELEVISION SET (200)

PORTABLE TERMINAL

CROSS REFERENCE TO RELATED APPLICATION(S)

The present disclosure relates to the subject matters contained in Japanese Patent Application No. 2008-248958 filed on Sep. 26, 2008, which are incorporated herein by reference in its entirety.

FIELD

The present invention relates to a portable terminal that receives contents from a counterpart device in a close proximity wireless communication system.

BACKGROUND

There are communication devices that are capable of performing proximity wireless communication. An example of such device is disclosed in JP-A-2005-045557 (counterpart U.S. publications are: US 2005/0064814 A1 and US 2007/0232232 A1). When information is transmitted to and received from another device, the communication device described in the publication JP-A-2005-045557 determines a transmission/reception direction by an operation button and transmits/receives the information. This information has a relatively small information amount and information contents displayed on the other device are directly transmitted and received.

The communication device described in the publication JP-A-2005-045557 has a special operation button for determining an information transmission/reception direction, which is operated by the user. In the case where a plurality of contents of a relatively large amount of information are stored, a content list needs to be first displayed before displaying the contents. However, in this case, a user interface, which sets one of the communication device and the other device to display the content list, is not disclosed.

SUMMARY

One of objects of the present invention is to provide a portable terminal of a close proximity wireless communication system that can simply display a content list without a special operation button to set one of the portable terminal and a counterpart device to display the content list, in terms of a user interface to select and receive contents between the portable terminal and the counterpart device storing the contents by proximity communication.

According to an aspect of the present invention, there is provided a portable terminal including: a display unit configured to display various information; an user interface; a proximity communication interface configured to establish a wireless communication path with a counterpart device in a proximity state; a detector configured to detect whether the portable terminal is in an enabled state capable of performing a content movement operation with the user interface or in a disabled state that is not capable of performing the content movement operation with the user interface; and a content controller configured to perform a process for controlling the display unit to display a list of contents which can be transmitted by the proximity communication, when the proximity communication interface establishes the wireless communication path and the detector detects that the portable terminal is in the enabled state.

According to another aspect of the present invention, there is provided a method for performing content communication with a portable terminal including a display unit and an user interface, the method including: establishing a wireless communication path with a counterpart device in a proximity state; detecting whether the portable terminal is in an enabled state capable of performing a content movement operation with the user interface or in a disabled state that is not capable of performing the content movement operation with the user interface; and performing a process for controlling the display unit to display a list of contents which can be transmitted by the proximity communication, when established the wireless communication path and detected that the portable terminal is in the enabled state.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 3 is a sequence diagram of a first sequence of the close proximity wireless communication system according to an embodiment of the present invention.

FIG. 4 is a sequence diagram of a second sequence of the close proximity wireless communication system according to an embodiment of the present invention.

FIG. 5 is an operation flowchart of a content control module of the portable terminal according to an embodiment of the present invention.

FIG. 6 is an operation flowchart of a content control module of the television set according to an embodiment of the present invention.

DETAILED DESCRIPTION OF THE EMBODIMENTS

Hereinafter, an embodiment of the invention will be described with reference to the accompanying drawings.

Figure 1:
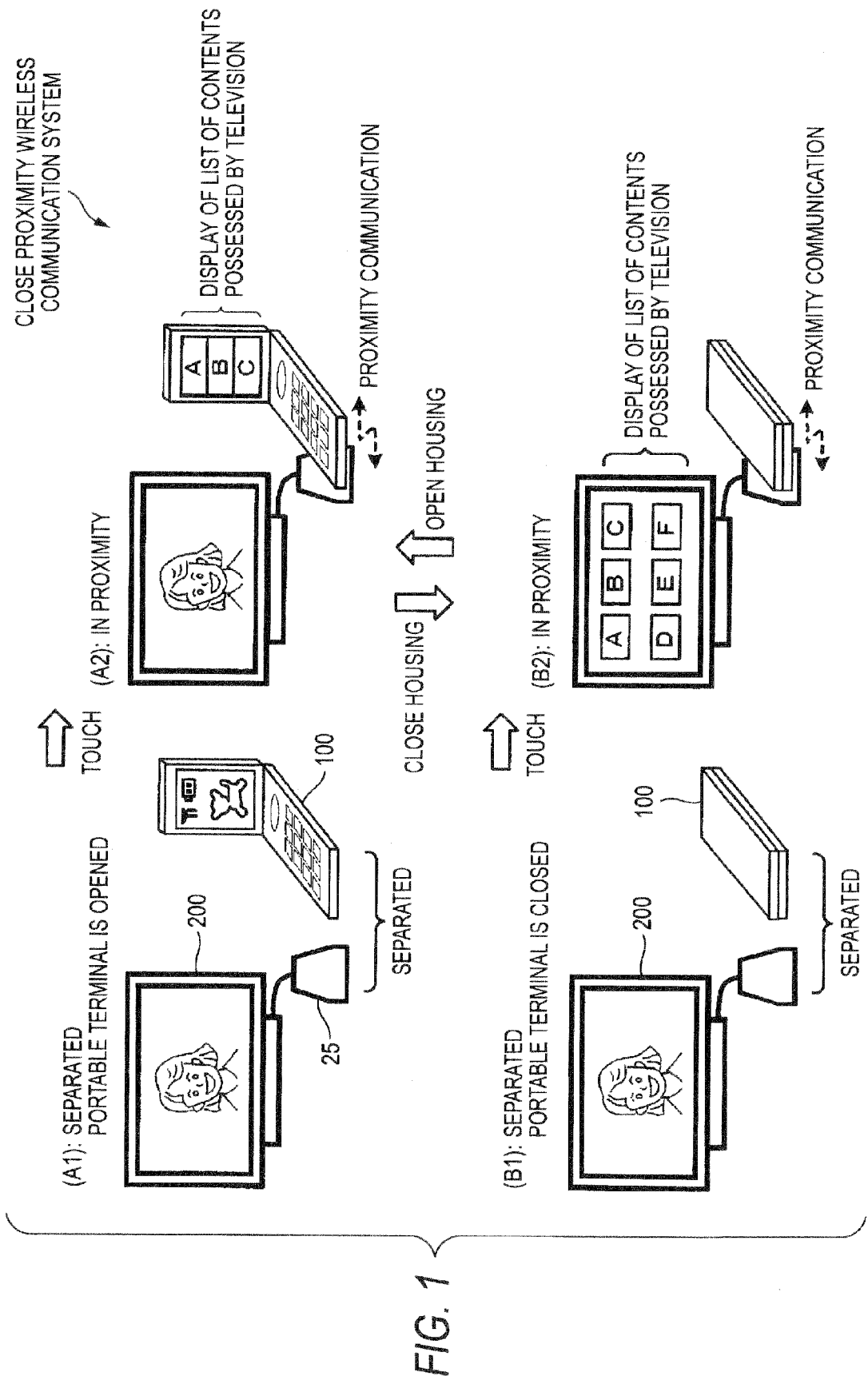
FIG. 1 is a system diagram of a close proximity wireless communication system according to an embodiment of the present invention.

FIG. 1 is a system diagram of a close proximity wireless communication system according to an embodiment of the present invention. A proximity communication interface 25 is connected to a television set 200 (a counterpart device) through a USB cable or the like. The proximity communication interface 25 performs proximity communication in a proximity state in which a portable terminal 100 such as a portable telephone or a portable PC having a proximity communication module touches, and is a device for transmitting and receiving various data to and from the portable terminal 100.

In the example of FIG. 1, the proximity communication interface 25 is connected to the television set 200 through a USB cable or the like, but the proximity communication interface 25 can be embedded into a main body of the television set 200. Since communication is performed in the proximity state of about several to several tens of centimeters using an induced electric field, the proximity communication has a characteristic that the occurrence of unintended communication with another device is unlikely.

Consequently, an action for placing the portable terminal in proximity to, or touching, the counterpart device can be considered as an indication of intention to perform data communication. The data communication can be performed by establishing a communication path in response to the proximity or touch.

Section (A1) of FIG. 1 shows a state in which a communication path for proximity communication is not established since a proximity communication interface 25 connected to the television set 200 is separated from the portable terminal 100, and a state in which a housing of the portable terminal 100 as a clamshell type is open. At this time, the television set 200 displays video included in program data obtained by decoding TV broadcast waves received through a tuner and outputs voice audio included in the program data. A standby screen is displayed on the portable terminal 100.

Section (A2) of FIG. 1 shows a state after proximity communication establishment when the user moves the portable terminal 100 from the (A1) state and touches the proximity communication interface 25 connected to the television set 200. The television set 200 stores program data in which TV broadcast waves received through the tuner are recorded, voice data attached to video downloaded through the Internet or the like, still image data contents received from a digital camera through a USB cable or the like, and a content list including content titles. The portable terminal 100 displays the content list by receiving the content list stored in the television set 200 through a near-field radio link established with the proximity communication interface 25. At this time, the standby screen of the portable terminal 100 is switched to display the content list.

On the other hand, while the television set 200 performs a process of receiving a content list transmission request through the proximity communication established between the proximity communication interface 25 and the portable terminal 100 and transmitting the content list to the portable terminal 100 in response to the request, an operation is continued to display video and output voice audio through a speaker by decoding the program data included in the TV broadcast waves received through the tuner without affecting viewing of the program data.

The user can select desired contents from among the contents stored in the television set 200 and receive the selected contents through the proximity communication by operating a key of the portable terminal 100.

Section (B1) of FIG. 1 shows a state in which a communication path of the proximity communication is not established since the portable terminal 100 is separated from the proximity communication interface 25 connected to the television set 200, and a state in which the housing of the portable terminal 100 is closed. Even in this case, as in the case of (A1), the television set 200 outputs voice audio and displays video obtained by decoding program data extracted from the TV broadcast waves through the tuner, and no video is displayed on the portable terminal 100.

Section (B2) of FIG. 1 shows a state after proximity communication establishment when the user moves the portable terminal 100 in the (B1) state and touches the proximity communication interface 25 connected to the television set 200. In this case, since the portable terminal 100 is in the closed state in which data cannot be displayed, the television set 200 is switched from a display operation of video obtained by decoding program data to a display operation of a content list stored by the television set 200. When the user selects desired contents by operating a key of the television set 200 or a remote controller key attached to the television set 200, the selected contents are transmitted to the portable terminal 100 through the proximity communication.

When the user closes the housing of the portable terminal 100 in the (A2) state, that is, in a state in which the content list received from the television set 200 is displayed, the state is automatically switched to the (B2) state by performing a process according to a state change between the portable terminal 100 and the television set 200, and the user can select contents by operating the key of the television set 200.

When the user opens the housing of the portable terminal 100 in the (B2) state, the state is also automatically switched to the (A2) state by performing a process according to a state change between the portable terminal 100 and the television set 200, and the user can select contents received from the television set 200 by operating the key of the portable terminal 100.

As such, since a content list display operation and a content selection operation are automatically switched between the portable terminal 100 and the television set 200 according to whether a content movement operation of the portable terminal 100 is enabled or disabled, the user can select contents and move the selected contents to the portable terminal 100 when operating a device on which the content list is displayed.

Figure 2:
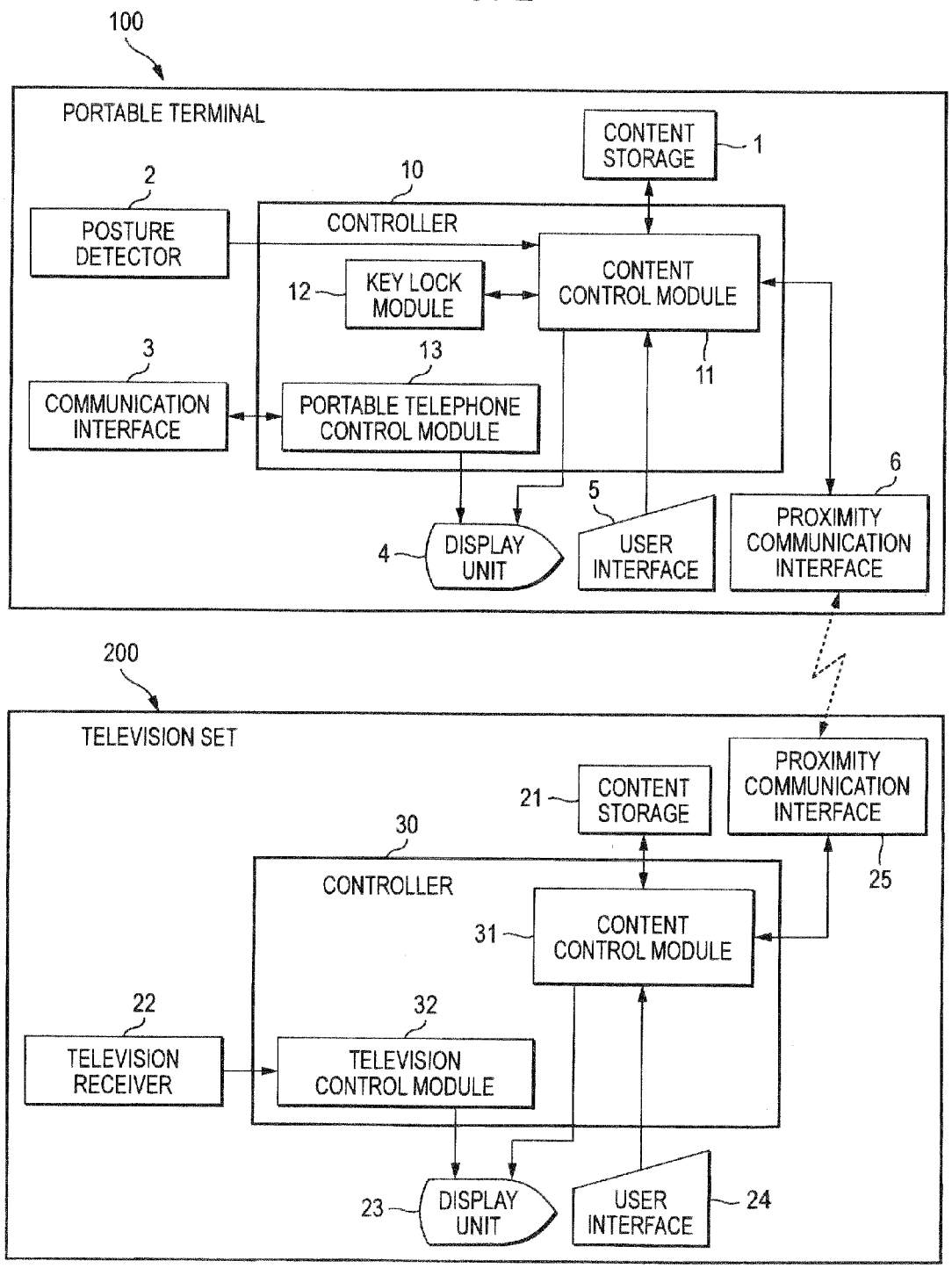
FIG. 2 is a block diagram of a portable terminal and a television set according to an embodiment of the present invention.

FIG. 2 is a block diagram of the portable terminal 100 and the television set 200 according to an embodiment of the present invention.

The portable terminal 100 includes a content storage 1, a posture detector 2, a communication interface 3, a display unit 4, an user interface 5, a proximity communication interface 6, and a controller 10. The controller 10 includes a CPU, a ROM, and a RAM, which are not shown, and executes a content control module 11, a key lock module 12, and a telephone control module 13 based on software stored in the ROM.

Next, the functions of the above-described elements will be described. The content storage 1 is a storage device for storing content data written by the content control module 11. The posture detector 2 is a Hall element or a switch to detect the open/close state of the clamshell type housing of the portable terminal 100, which is read by the content control module 11. The communication interface 3 transmits and receives a radio signal to and from a base station constituting a portable telephone network (not shown), and performs frequency conversion, modulation, and demodulation processes for data to be transmitted and received. Data is transmitted to and received from the portable telephone control module 13.

The display unit 4 is a display device as a user interface including a display controller and an LCD, and displays various types of information about communication to be executed by the portable telephone control module 13. For example, radio wave strength, a caller name upon incoming call reception, and call duration are displayed. Also, the display unit 4 displays various types of information about contents to be executed by the content control module 11. For example, a content list and video contents are displayed.

The user interface 5 is an input interface including numeric keys, module keys, and a power key.

The proximity communication interface 6 establishes a communication path by an induced electric field according to proximity to the proximity communication interface 25 connected to the television set 200, releases the communication path by exiting a range in which communication with the proximity communication interface 25 is possible, and sends an establishment signal and a release signal to the controller 10 according to the establishment and release of the communication path. The proximity communication interface 6 modulates and demodulates data to be transmitted and received to and from the proximity communication interface 25.

The content control module 11 of the controller 10 is started by the establishment signal indicating that the communication path is established from the proximity communication interface 6 and executes a process for receiving a content list or contents stored in the television set 200 through the proximity communication interface 6 after the start. Details of the content control module 11 will be described with reference to FIGS. 3 to 6 to be described later.

The key lock module 12 controls the key lock setting for ON/OFF to prevent other key inputs except for the power key of the user interface 5. The portable telephone control module 13 transmits and receives data to and from the communication interface 3 or causes the display unit 4 to display data about a portable telephone.

The television set 200 includes a content storage 21, a television receiver 22, a display unit 23, an user interface 24, the proximity communication interface 25, and a controller 30. The controller 30 includes a CPU, a ROM, and a RAM, which are not shown, and executes a content control module 31 and a television control module 32 based on software stored in the ROM.

Next, the functions of the above-described elements will be described. The content storage 21 stores contents such as program data extracted from TV broadcast waves received through the television receiver 22, music data attached to video downloaded through the Internet, and still image data received from a digital camera through a USB cable or the like. The television receiver 22 receives and demodulates the TV broadcast waves and sends demodulated data to the television control module 32.

The display unit 23 is display device as a user interface including a display controller and an LCD, and displays video of a television broadcast obtained by decoding program data in the television control module 32. Also, contents from the content control module 31 are displayed. The user interface 24 is input interface of a user interface of operation keys, etc. A remote controller (not shown) can be included.

The proximity communication interface 25 establishes a communication path by an induced electric field when the proximity communication interface 6 of the portable terminal 100 is in proximity thereto by touch, releases the communication path when the portable terminal 100 exits a range in which communication is possible, and sends an establishment signal and a release signal to the controller 30 according to the establishment and release of the communication path. The proximity communication interface 25 modulates and demodulates data to be transmitted to and received from the portable terminal 100.

When the content control module 31 of the controller 30 is started, a content list stored in the content storage 21 is transmitted to the portable terminal 100 through the proximity communication interface 25 according to a state of the portable terminal 100, and sends contents stored in the content storage 21 to the portable terminal 100 through the proximity communication interface 25 in response to a request from the portable terminal 100 or an instruction by a key operation of the television set 100 or a key operation of the remote controller. Details of the content control module 31 will be described with reference to FIGS. 3 to 6 to be described later.

The television control module 32 causes the display unit 23 to display video obtained by decoding program data extracted by the tuner of the television receiver 22 from TV broadcast waves.

FIG. 3 is a diagram showing a sequence (first sequence) of a communication process performed between the portable terminal 100 and the television set 200 according to an embodiment of the present invention, showing a process performed among the display unit 4 and the user interface 5 as the user interface, the content control module 11, and the proximity communication interface 6 of the portable terminal 100, and the display unit 23 and the user interface 24 as the user interface, the content control module 31, and the proximity communication interface 25 of the television set 200 in the case of a transition state from section (A1) to (A2) of FIG. 1, and showing a transition state from section (A2) to (B2) of FIG. 1.

In a state of section (A1) of FIG. 1, since a proximity communication path is not established between the portable terminal 100 and the proximity communication interface 25 connected to the television set 200 in a state in which the portable terminal 100 is separated from the television set 200, the content control module 11 and the content control module 31 are not started. In this state, the portable telephone control module 13 (FIG. 2) causes the display unit 4 of the portable terminal 100 to display the standby screen of the portable telephone (Q1). The television control module 32 (FIG. 2) causes the display unit 23 of the television set 200 to display video obtained by decoding program information extracted from TV broadcast waves (Q2).

In a state of section (A2) of FIG. 1, when the user places the proximity communication interface 25 in proximity by touching in a state in which the housing of the portable terminal 100 is open (Q3), a communication path is established between the proximity communication interface 6 of the portable terminal 100 and the proximity communication interface 25 (Q4), and establishment signals indicating that the communication path is established are issued from the proximity communication interface 6 and the proximity communication interface 25 and the content control module 11 of the portable terminal 100 and the content control module 31 of the television set 200 are started by the establishment signals (Q5 and Q6).

The content control module 11 of the portable terminal 100 checks the open/close state of the housing of the posture detector 2 immediately after the start (Q7).

Since the user can select contents and make a movement request regarding contents stored in the television set 200 by operating the user interface 5 while viewing the display unit 4 of the portable terminal 100 when the housing is in the open state, the content control module 11 sends a transmission request of a content list of contents stored in the television set 200 to the television set 200 through the proximity communication interface 6 by determining that a content movement operation is enabled when it is the state is open in the checking (Q11).

On the other hand, the content control module 31 of the television set 200 reads and sends the content list stored in the content storage 21 to the portable terminal 100 through the proximity communication interface 25 when the content list transmission request (Q11) is received through the proximity communication interface 25 after the start (Q13).

The content list transmission request received by the television set 200 in Q11 can include preset conditions of a content genre and a content size (for example, an upper limit). In this case, the content control module 31 creates a suitable content list under the conditions from the content storage 21 and sends the created content list to the portable terminal 100.

When the content list is received through the proximity communication interface 6, the content control module 11 of the portable terminal 100 commands the display unit 4 to display the content list (Q14). The display unit 4 switches the screen from the standby screen to the content list (Q15).

In this state, the content control module 11 waits for the user operation to designate a content to be acquired from the television set 200. The user operation is provided through a key of the user interface 5 of the portable terminal 100. During this waiting period, the content control module 11 checks the open/close state of the posture detector 2 since there is a possibility that the open/close state of the housing may be changed (Q16).

When the housing is in the open state, that is, when the content movement operation is continuously enabled, the content control module 11 waits for the user to select contents. When the user interface 5 of the portable terminal 100 is operated and contents of the content list is selected (Q17), the content control module 11 receives information for specifying contents of a content title selected from the user interface 5 (Q18) and requests the television set 200 to transmit the contents through the proximity communication interface 6 (Q19).

When the content transmission request is received through the proximity communication interface 25, the content control module 31 of the television set 200 reads contents retrieved based on the information for specifying the contents included in the transmission request from the contents stored in the content storage 21 and transmits the read contents to the portable terminal 100 through the proximity communication interface 25 (Q20).

When the contents are received through the proximity communication interface 6, the content control module 11 of the portable terminal 100 stores the contents in the content storage 1 (Q21), and commands the display unit 4 to display the contents (Q22). The display unit 4 displays the contents (Q23).

When the content control module 11 of the portable terminal 100 detects that the housing is changed from the open state to the closed state in Q16, a process indicated by the dotted line arrow is executed and the "transition of section (A2) of FIG. 1☐ (B2)" is executed. Details thereof will be described in the "transition of section (A2) of FIG. 1☐ (B2)" to be described later.

In an operation in which the portable terminal 100 displays contents on the display unit 4 in response to content acquisition from the television set 200, various cases can be considered such as a case where video included in a content element is displayed by reproducing the content element, for example, when one content element is acquired, and a case where information indicating only contents for which an acquisition process is completed is displayed.

As such, since the content list is displayed on the display unit 4 of the portable terminal 100 simply by making the portable terminal 100 be in proximity to the television set 200 in a state in which the operation of the portable terminal 100 is enabled, the user can select and receive contents acquired by operating a key of the user interface 5 of the portable terminal 100. At this time, at the side of the television set 200, video can be continuously displayed based on program data extracted from TV broadcast waves and can be continuously viewed by the user.

FIG. 4 is a diagram showing a sequence (second sequence) of a communication process performed between the portable terminal 100 and the television set 200 according to an embodiment of the present invention, and showing a process when a transition state from Section (B1) of FIG. 1 to (B2) exists. Also, a transition state from Section (B2) of FIG. 1 to (A2) is shown. The same parts as those of the sequence of FIG. 3 are denoted by the same sequence Q numerals and described.

In a state of section (B1) of FIG. 1, since this is same as the case of FIG. 3 in state in which the portable terminal 100 is separated from the television set 200, but the housing of the terminal 100 is closed, the display operation of the display unit 4 is turned off. On the other hand, video acquired by decoding program information extracted by the television control module 32 from TV broadcast waves is displayed on the display unit 23 of the television set 200 (Q2).

In a state of section (B2) of FIG. 1, when the user places the television set 200 in proximity by touching in a state in which the housing of the portable terminal 100 is closed (Q3), a communication path is established between the proximity communication interface 6 of the portable terminal 100 and the proximity communication interface 25 connected to the television set 200 (Q4), and establishment signals indicating that the communication path is established are issued from the proximity communication interface 6 and the proximity communication interface 25 and the content control module 11 of the portable terminal 100 and the content control module 31 of the television set 200 are started by the establishment signals (Q5 and Q6). The content control module 11 of the portable terminal 100 checks the open/close state of the housing of the posture detector 2 immediately after the start (Q7).

By determining that a content movement operation is disabled in the check when the portable terminal 100 is in the closed state, the content control module 11 transmits a content list display request to the television set 200 through the proximity communication interface 6 so as to cause the display unit 23 of the television set 200 to display a content list of contents stored by the television set 200 (Q52).

When the content list display request is received through the proximity communication interface 25 after the start, the content control module 31 of the television set 200 commands the display unit 23 to display the content list (Q53). At this time, the display unit 23 is switched from the video display operation to the content list display operation based on program data (Q54).

The content list transmission request can include preset conditions of a content genre and a content size (for example, an upper limit). In this case, the content control module 31 creates a suitable content list under the conditions from the content storage 21 and displays the content list on the display unit 23. In this state, the content control module 31 waits user operation for the designation of contents, which are to be moved to the portable terminal 100, to be input. The user interface 24 of the television set 200 or the remote controller key is operated by the user to designate contents.

During this period, the content control module 11 of the portable terminal 100 waits for contents operated and selected at the side of the television set 200 to be transmitted. However, since there is a possibility that a content movement operation enablement determination in Q7 may be changed, that is, since there is a possibility that the open/close state of the housing may be changed, the posture detector 2 checks the open/close state of the housing to be detected (Q55).

When the closed state of the housing, that is, the disabled content movement operation, is continued, in Q55, the content control module 11 waits the user operation for the designation of contents, which are to be moved to the portable terminal 100, to be input. The user interface 24 of the television set 200 or the remote controller key is operated by the user to designate contents.

In a state in which the content list is displayed on the display unit 23 of the television set 200 in Q54, the user selects contents to be moved from the content list by operating the user interface 24 of the television set 200 or the remote controller key (Q56). When the key is operated and selected, the content control module 31 receives identification information of the selected contents (Q57) and reads the contents from the content storage 21 based on this identification information and transmits the read contents to the portable terminal 100 through the proximity communication interface 25 (Q58).

The content control module 11 of the portable terminal 100 stores the contents (Q58) received through the proximity communication interface 6 in the content storage 1 (Q59).

When it is detected that the housing is changed from the closed state to the open state in Q55, the content control module 11 of the portable terminal 100 performs a process indicated by the dotted line arrow and a transition of section (B2) to (A2) of FIG. 1 is executed. Details thereof will be described later.

As such, since the content list is displayed on the display unit 23 of the television set 200 simply by making the portable terminal 100 be in proximity to the television set 200 in a state in which the operation of the portable terminal 100 is disabled, the user can select contents by operating the user interface 24 of the television set 200 or the remote controller key and can move the desired contents to the portable terminal 100.

Referring to FIGS. 3 and 4, a transition of section (A2) to (B2) of FIG. 1 and a transition of section (B2) to (A2) of FIG. 1 will be described.

At the time of Q16 of FIG. 3, the state of section (A2) of FIG. 1, that is, the content list is displayed on the display unit 4 of the portable terminal 100 (Q15). When the user closes the housing of the portable terminal 100 in this state, the content control module 11 of the portable terminal 100 determines that the content movement operation is changed to be disabled in Q16 and commands the display unit 4 to turn off the content list display (Q24), and the display unit 4 turns off the content list display operation (which is not shown). The content control module 11 moves after Q52 of FIG. 4.

After Q52 of FIG. 4, the content list is displayed on the display unit 23 of the television set 200 and the state becomes that of section (B2) of FIG. 1 as described above. The user selects contents to be moved to the terminal 100 by operating the user interface 24 of the television set 200 or the remote controller key, so that the portable terminal 100 can receive the contents.

At the time of Q55 of FIG. 4, the state of section (B2) of FIG. 1, that is, the content list is displayed on the display unit 23 of the television set 200 (Q54). When the user opens the housing of the portable terminal 100 in this state, the content control module 11 of the portable terminal 100 determines that the content movement operation is changed to be enabled in Q55 and transmits a content list transmission request to the television set 200 through the proximity communication interface 6 as indicated by the dotted line arrow (Q60).

Upon receipt of the content list transmission request, the content control module 31 of the television set 200 commands the display unit 23 to turn off the content list display operation as indicated by the dotted line arrow (Q61). Consequently, a change is made from the content list display operation (Q54 of FIG. 4) to the display operation of video obtained by decoding program data extracted from TV broadcast waves (which is not shown).

The content control module 11 of the portable terminal 100 moves after the above-described Q13 of FIG. 3 as indicated by the dotted line arrow.

After Q13 of FIG. 3, the content list is displayed on the display unit 4 of the portable terminal 100 and the state becomes that of section (A2) of FIG. 1 as described above. The user selects contents to be moved from the television set 200 by operating the user interface 5 of the portable terminal 100, and the portable terminal 100 receives the contents from the television set 200 in response to the selection.

As such, since the display operation of the other device is automatically switched even when an operation enabled/disabled state of the portable terminal 100 is switched in a state in which the content list is displayed on the display unit of the portable terminal 100 or the television set 200, the user can operate a key of the user interface of the device (including the remote controller in the case of the television set) on which the content list is displayed, and the portable terminal 100 can receive the desired contents according to the operation.

FIG. 5 is an operation flowchart of the content control module 11 of the portable terminal 100 according to an embodiment of the present invention. Along with the step S numerals of the operation flowchart, the sequence Q numerals of the sequence diagrams of FIGS. 3 and 4 are included.

When the content control module 11 is started, the open/close state of the housing of the posture detector 2 is checked (step S1 and sequence Q7).

A case where a content movement operation is enabled, which is related to the sequence of the portable terminal 100 of FIG. 3 and section (A2) of FIG. 1 will be described.

By determining that the content movement operation is enabled when the state is the open state in step S1, a transmission request of a content list of contents stored by the television set 200 is transmitted to the television set 200 through the proximity communication interface 6 (S2 and Q11). The content list is received through the proximity communication interface 6 (S3 and Q13). The content list is displayed on the display unit 4 (S4 and Q14). Thereby, the state becomes that of section (A2) of FIG. 1.

Thereafter, content designation by the operation of the user is checked by checking the user interface 5 (S5). In parallel, the open/close state is identified by checking the open/close state of the posture detector 2 (S6 and Q16). This is to identify whether a change is made after determining that the content movement operation is enabled in the open state in step S1.

When the content movement operation is continuously enabled in the open state in step S6 (the state of section (A2) of FIG. 1) and the content designation of information for specifying contents of a content title, etc., in step S5 exists (Q18), a content transmission request is transmitted to the television set 200 through the proximity communication interface 6 (S7 and Q19). The contents (Q20) transmitted from the television set 200 through the proximity communication interface 6 are received (S8) and stored in the content storage 1 (S9 and Q21).

The content control is terminated by displaying the contents on the display unit 4 (S10, Q22, and Q23). In the content display operation as described above, there are a case where the acquired contents are reproduced and a case where information indicating that a content acquisition process is terminated is displayed.

A case where a content movement operation is disabled, which is related to the sequence of the portable terminal 100 of FIG. 4 and section (B2) of FIG. 1, will be described.

By determining the content movement operation is disabled when the housing is in the closed state in step S1, a content list display request is transmitted to the television set 200 through the proximity communication interface 6 so that a content list of contents stored by the television set 200 is displayed at the side of the television set 200 (S22 and Q52).

Thereafter, the television set waits for the operated and selected contents to be transmitted through the proximity communication interface 6 (S23). In parallel, the open/close state to be detected by the posture detector 2 is checked (S24 and Q55). This is to identify whether a change is made after determining that the content movement operation is disabled in the closed state in step S1.

When the content movement operation is continuously disabled in the closed state in step S24 and the contents are received in step S23 (Q58), the contents are stored in the content storage 1 (S25 and Q59) and the content control is terminated.

When the state is that of section (A2) of FIG. 1 during the check of step S6, but it is determined that the content movement operation is disabled in the closed state in S6, the content list display operation of the display unit 4 is turned off (S11 and Q24). The movement to step S22 is made and the transition to the state of section (B2) of FIG. 1 is made by a process after S22.

When the state is that of section (B2) of FIG. 1 during the check of step S24, but it is determined that the content movement operation is enabled in the open state in S24, a content list request is sent to the television set 200 through the proximity communication interface 6 (S26 and Q60). The movement to step S3 is made and the transition to the state of section (A2) of FIG. 1 is made by a process after S3.

In the operation flowchart of the content control module 11 of FIG. 5, all processes of the content control module 11 of the portable terminal 100 of FIGS. 3 and 4 are executed as described with the sequence Q numerals.

FIG. 6 is an operation flowchart of the content control module 31 of the television set 200 according to an embodiment of the present invention. Along with the step S numerals of this operation flowchart, the sequence Q numerals of the sequence diagrams of FIGS. 3 and 4 are included.

When the content control module 31 is started, a request from the portable terminal 100 through the proximity communication interface 6 is checked (S51).

When the content list request (Q11) is received in step S51, a list of contents stored in the content storage 21 is read and transmitted to the portable terminal 100 through the proximity communication interface 25 (Q53 and Q13).

Thereafter, the request transmitted from the portable terminal 100 through the proximity communication interface 25 is checked (S54). When a content transmission request exists in step S54 (Q19), contents retrieved based on information for specifying contents included in the transmission request from the contents stored in the content storage 21 are read and transmitted to the portable terminal 100 through the proximity communication interface 25 (S55 and Q20) and the content control is terminated.

When the content list display request (Q52) is received in step S51 after the start, the display unit 23 displays the content list (S61 and Q53). Thereafter, the user interface 24 of the television set 200 or the remote controller key is operated by the user and the selection input of contents to be moved to the portable terminal 100 is checked (S62). In parallel, the request transmitted from the portable terminal 100 through the proximity communication interface 25 is checked (S63).

When the contents are selected in step S62 (Q57), the contents read from the content storage 21 based on identification information of the selected contents are transmitted to the portable terminal 100 through the proximity communication interface 25 (S64 and Q58) and the content control is terminated.

When the state is that of section (A2) of FIG. 1 during the check of step S54, but the content list display request exists in S54 (Q52), the movement to step S61 is made and the transition to the state of section (B2) of FIG. 1 is made by a process after S61.

When the state is that of section (B2) of FIG. 1 during the check of step S63, but the content list transmission request exists in S63 (Q60), the content list display operation of the display unit 23 is turned off (S65 and Q61). Thereby, the display unit 23 is switched to an operation to display video obtained by decoding program data included in TV broadcast waves before the content list is displayed. The movement to step S53 is made and the transition to the state of section (A2) of FIG. 1 is made by a process after S53.

In the operation flowchart of the content control module 31 of FIG. 6, all processes of the content control module 31 of the television set 200 of FIGS. 3 and 4 are executed as described with the sequence Q numerals.

According to an embodiment of the present invention, if the content movement operation of the portable terminal 100 is enabled according to the enablement/disablement of the content movement operation of the portable terminal 100, a content list of contents possessed by the television set 200 is automatically displayed to the portable terminal 100 only when the user makes the portable terminal 100 touch the television set 200. If the content movement operation of the portable terminal 100 is disabled, the content list possessed by the television set 200 is automatically displayed on the television set 200, so that the user selects contents by operating the user interface of the device in which the display operation is performed and therefore the portable terminal 100 can automatically receive the contents.

The content movement enablement/disablement of the portable terminal 100 corresponds to the open/close state of the housing of the portable terminal 100, but may correspond to the non-key lock setting/key lock setting of the user interface of the portable terminal 100.

As described with reference to the embodiment, according to the present invention, a content list can be simply displayed without a special operation button to set one of the portable terminal and a counterpart device to display the content list, in terms of a user interface to select and receive contents between the portable terminal and the counterpart device storing the contents by proximity communication. Also, the original display of each device can be utilized.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable terminal comprising:
 a display unit configured to display various information;
 an user interface;
 a proximity communication interface configured to establish a wireless communication path with a counterpart device in a proximity state;
 a detector configured to detect whether the portable terminal is in an enabled state capable of performing a content movement operation with the user interface or in a disabled state that is not capable of performing the content movement operation with the user interface, the enabled state being a state in which the portable terminal allows an operation for moving contents to be entered into the user interface, and the disabled state being a state in which the portable terminal does not allow an operation for moving contents to be entered into the user interface; and a content controller configured to perform a process for controlling the display unit to display a list of contents which can be transmitted by the proximity communication, when the proximity communication interface establishes the wireless communication path and the detector detects that the portable terminal is in the enabled state, wherein when the proximity communication interface establishes the wireless communication path and the detector detects that the portable terminal is in the enabled state, the content controller performs a process comprising:

performing a transmission request to transmit a list of contents stored in the counterpart device through the wireless communication path;

controlling the display unit to display the content list received from the counterpart device in response to the list transmission request; and requesting the counterpart device to transmit designated contents through the wireless communication path when the contents to be moved from the displayed content list are designated through the user interface, and wherein when the proximity communication interface establishes the wireless communication path and the detector detects that the portable terminal is in the disabled state, the content controller performs, a process comprising:

performing a list display request through the wireless communication path to request the counterpart device to display the content list on a display unit provided in the counterpart device.

2. The portable terminal of claim 1, wherein when the proximity communication interface establishes the wireless communication path and the detector detects that the portable terminal is in the disabled state, the content controller performs a process comprising:

performing a list display request through the wireless communication path to request the counterpart device to display the content list on a display unit provided in the counterpart device, and wherein when the detector detects that the portable terminal is switched from the disabled state to the enabled state, the content controller performs a process comprising:

performing a transmission request to transmit a list of contents stored in the counterpart device through the wireless communication path; and controlling the display unit to display the content list received from the counterpart device in response to the list transmission request.

3. The portable terminal of claim 1, wherein the enabled state and the disabled state correspond respectively to an opened state and a closed state of an openable housing of the portable terminal.

4. The portable terminal of claim 1, wherein the enabled state and the disabled state correspond respectively to an unlocked state and a locked state of key lock setting of the user interface.

5. A method for performing content communication with a portable terminal comprising a display unit and an user interface, the method comprising:

establishing a wireless communication path with a counterpart device in a proximity state;

detecting whether the portable terminal is in an enabled state capable of performing a content movement operation with the user interface or in a disabled state that is not capable of performing the content movement operation with the user interface, the enabled state being a state in which the portable terminal allows an operation for moving contents to be entered into the user interface, and the disabled state being a state in which the portable terminal does not allow an operation for moving contents to be entered into the user interface; and performing a process for controlling the display unit to display a list of contents which can be transmitted by the proximity communication, when established the wireless communication path and detected that the portable terminal is in the enabled state, wherein when established the wireless communication path and detected that the portable terminal is in the enabled state, the portable terminal performs a process comprising:

performing a transmission request to transmit a list of contents stored in the counterpart device through the wireless communication path;

controlling the display unit to display the content list received from the counterpart device in response to the list transmission request; and requesting the counterpart device to transmit designated contents through the wireless communication path when the contents to be moved from the displayed content list are designated through the user interface, and wherein when established the wireless communication path and detected that the portable terminal is in the disabled state, the portable terminal performs a process comprising:

performing a list display request through the wireless communication path to request the counterpart device to display the content list on a display unit provided in the counterpart device.

6. The method of claim 5, wherein when established the wireless communication path and detected that the portable terminal is in the disabled state, the portable terminal performs a process comprising:

performing a list display request through the wireless communication path to request the counterpart device to display the content list on a display unit provided in the counterpart device, and wherein when detected that the portable terminal is switched from the disabled state to the enabled state, the portable terminal performs a process comprising:

performing a transmission request to transmit a list of contents stored in the counterpart device through the wireless communication path; and controlling the display unit to display the content list received from the counterpart device in response to the list transmission request.

7. The method of claim 5, wherein the enabled state and the disabled state correspond respectively to an opened state and a closed state of an openable housing of the portable terminal.

8. The method of claim 5, wherein the enabled state and the disabled state correspond respectively to an unlocked state and a locked state of key lock setting of the user interface.

* * * * *

UNITED STATES PATENT AND TRADEMARK OFFICE
CERTIFICATE OF CORRECTION

| | |
|---|---|
| PATENT NO. | : 8,180,287 B2 |
| APPLICATION NO. | : 12/558791 |
| DATED | : May 15, 2012 |
| INVENTOR(S) | : Takeda |

It is certified that error appears in the above-identified patent and that said Letters Patent is hereby corrected as shown below:

On the Face Page, in Field (73), under "Assignee", in Column 1, Line 1, after "Toshiba" insert -- Mobile --.

Signed and Sealed this
Twenty-fourth Day of July, 2012

David J. Kappos
*Director of the United States Patent and Trademark Office*